(12) United States Patent
Ikunami

(10) Patent No.: US 8,049,603 B2
(45) Date of Patent: Nov. 1, 2011

(54) ON-VEHICLE DISPLAY DEVICE

(75) Inventor: Takahiro Ikunami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 421 days.

(21) Appl. No.: 12/304,255

(22) PCT Filed: Jan. 15, 2007

(86) PCT No.: PCT/JP2007/050382
§ 371 (c)(1),
(2), (4) Date: Dec. 10, 2008

(87) PCT Pub. No.: WO2007/144987
PCT Pub. Date: Dec. 21, 2007

(65) Prior Publication Data
US 2009/0251328 A1    Oct. 8, 2009

(30) Foreign Application Priority Data
Jun. 12, 2006  (JP) ................ 2006-162524

(51) Int. Cl.
*G08B 21/00*    (2006.01)
(52) U.S. Cl. ... 340/438; 340/441; 340/461; 340/995.14; 348/837; 361/679.06
(58) Field of Classification Search .......... 340/438, 340/441, 461, 462, 691.6, 815.4, 995.1, 995.14, 340/995.16, 995.27, 995.28; 361/679; 348/825, 348/837
See application file for complete search history.

(56) References Cited

U.S. PATENT DOCUMENTS

| | | | |
|---|---|---|---|
| 5,946,055 A | 8/1999 | Rosen | |
| 6,115,086 A * | 9/2000 | Rosen | 348/837 |
| 6,724,317 B1 * | 4/2004 | Kitano et al. | 340/691.1 |
| 7,571,038 B2 * | 8/2009 | Butler et al. | 701/36 |
| 2002/0140687 A1 | 10/2002 | Takeda | |
| 2004/0038769 A1 | 2/2004 | Eibler | |

FOREIGN PATENT DOCUMENTS

| | | |
|---|---|---|
| JP | 11-342798 A | 12/1999 |
| JP | 2002-234400 A | 8/2002 |
| JP | 2002-293194 A | 10/2002 |
| JP | 2004-082835 A | 3/2004 |
| JP | 2004-090722 A | 3/2004 |
| JP | 2005-335564 A | 12/2005 |
| WO | WO-99/00976 A1 | 1/1999 |

* cited by examiner

*Primary Examiner* — Jennifer Mehmood
*Assistant Examiner* — Mark Rushing
(74) *Attorney, Agent, or Firm* — Birch, Stewart, Kolasch & Birch, LLP

(57) ABSTRACT

An on-vehicle display device mounted on a ceiling including an open and close mechanism, which secures the rearward visibility during the backward driving of the vehicle and also enables the user to continue to enjoy display images. The on-vehicle display device includes a control means which controls the display 1, when the display 1 is open at a best view-angle position, to move in even more widely open direction to a predetermined angle (an displacement-angle position 1b), upon detection of entering a backward driving state of the vehicle. The display 1 is controlled to return to the best view-angle position when the backward driving state of the vehicle is terminated.

6 Claims, 5 Drawing Sheets

ON-VEHICLE DISPLAY DEVICE

CROSS-REFERENCE TO RELATED APPLICATIONS

The present application is the National Stage under 35 U.S.C. §371 of International Application No. PCT/JP2007/050382 filed Jan. 15, 2007, which claims priority to Japanese Application No. 2006-162524 filed Jun. 12, 2006, the entire contents of each of the aforementioned applications being incorporated herein by reference.

FIELD OF THE INVENTION

The present invention relates to an on-vehicle display device that electrically performs an open and close control of a ceiling-mounted display in a vehicle.

BACKGROUND OF THE INVENTION

In an on-vehicle display device that electrically performs an open and close control of a ceiling-mounted display in a vehicle, the display is viewed in an open state. The display in use, however, interferes with the rearward view of the driver in the case of backward driving of the vehicle.

For dealing therewith, there is an on-vehicle monitoring system in which a rear monitor is moved to a storage position in response to detecting the operation of backward driving by the driving user, and thereafter, is moved to its usable position when the transmission gear is shifted into park (Japanese Laid-Open Patent Publication No. 2004-90722).

In the on-vehicle monitoring system according to this Patent Document, when the vehicle is driven backward, the monitor is moved to the storage position, that is, the position where the rear monitor is closed so that the display surface of the rear monitor becomes parallel and in proximity to the ceiling plane, which results in a condition not interfering with the rearward view of the driver. However, continuous viewing for a user who has been enjoying images on the display screen is interrupted. Furthermore, displacing the rear monitor to the storage position needs some length of time.

With the conventional on-vehicle monitoring system, although the rearward view of the driver is secured during backward driving of the vehicle, there remains a problem that the user could not continue to enjoy display images because the monitor is fully shut away.

The present invention is accomplished to solve the above problem, and the purpose thereof is to make it possible for the user to continue to enjoy display images while securing the rearward view of the driver during backward driving of the vehicle.

SUMMARY OF THE INVENTION

The on-vehicle display device of the present invention comprises a control means that controls a display when it is open at a view-angle position, to move in more widely open direction to a predetermined angle, upon detection of entering a backward driving state of a vehicle.

According to the invention, the user will be able to continue to enjoy display images, while securing the rearward view of the driver during backward driving of the vehicle.

DETAILED DESCRIPTION OF THE PREFERRED EMBODIMENT

Hereinafter, embodiments of the present invention will be explained on the basis of the drawings.

Embodiment 1

Figure 1:
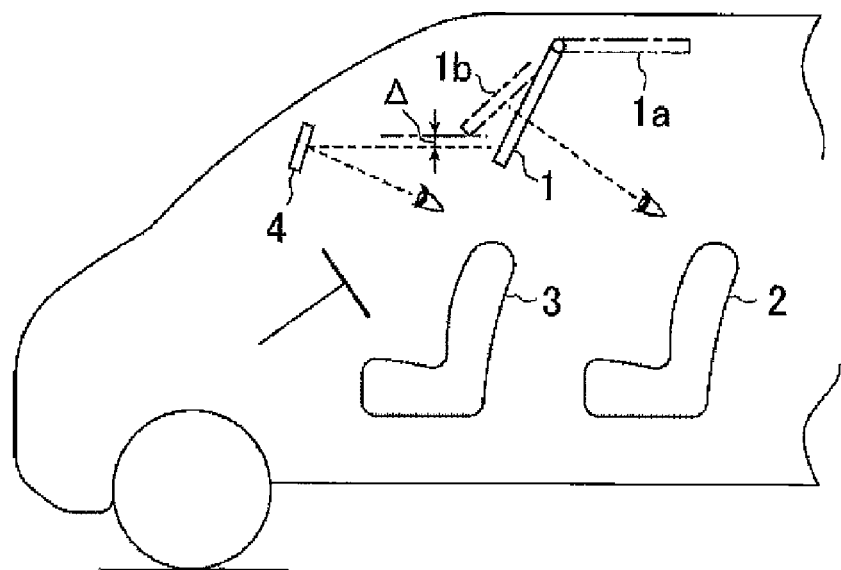
FIG. 1 is an explanatory view showing an arrangement of a display and a viewer in a vehicle cabin.

As shown in FIG. 1, a display 1 is mounted on the ceiling of a vehicle cabin. When the display 1 is not used, it turns out to its home position 1a shown by the dashed line. At the home position 1a, the display 1 has been displaced to the closed position where the display is parallel to the ceiling of the vehicle cabin. On the other hand, when the display 1 is in use, it is kept open, as shown by the solid line, at a view-angle position that permits a good visibility for the viewer sitting on a seat 2.

The lower end portion of the display 1 open at the view angle is partially interfering with the driver's view when the driver on a front driver seat 3 is to confirm a backward condition through a room mirror 4. Thus, to secure the rearward view of the driver, the driver has to adjust the angle of the room mirror 4 or to change eye location, or to displace the display 1 to the home position.

According to the present invention, the display 1 will be displaced when the driver needs to confirm a backward condition, and its feature resides in the direction for displacement, that is, contrary to the conventional manner in which the display is returned back to the home position, it is pivotally turned toward even more widely open position than the view-angle position so as to be displaced to an displaced-angle position 1b. Such a displacement toward more open side allows the lower end portion of the display to shift to upside so as to widen a field of view by the dimension Δ, to thereby secure the rearward view of the driver. At the same time, the viewer sitting on the seat 2 can enjoy images sufficiently, although its appearance on the display 1 is slightly different to the previous one at the view-angle position.

In the following embodiment, the display 1 will be displaced when the transmission gear is shifted into a reverse position. The display 1 will be returned back to the original view-angle position when the transmission gear is released from the reverse position. The details are shown below.

Figure 2:
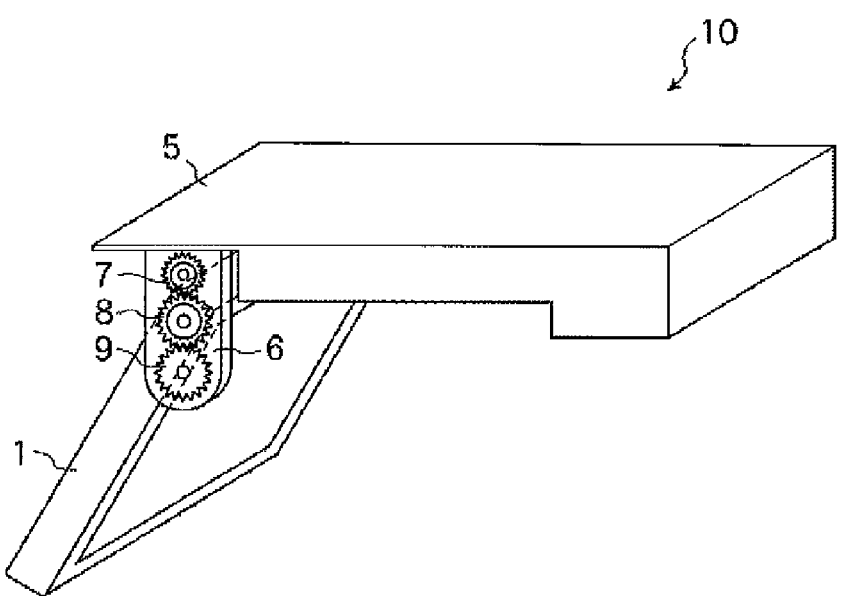
FIG. 2 is an externally perspective view of a display unit.
Figure 3:
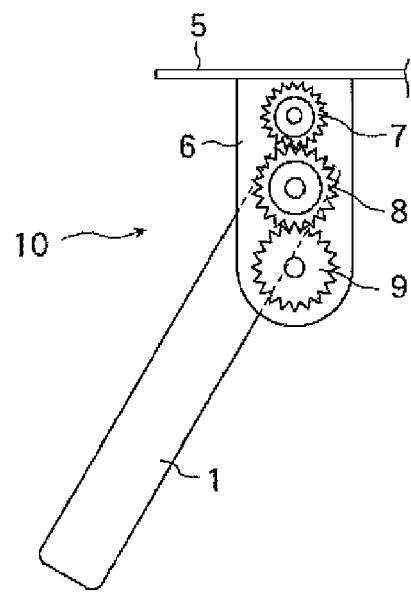
FIG. 3 is a front view of a display and a moving mechanism.
Figure 4:
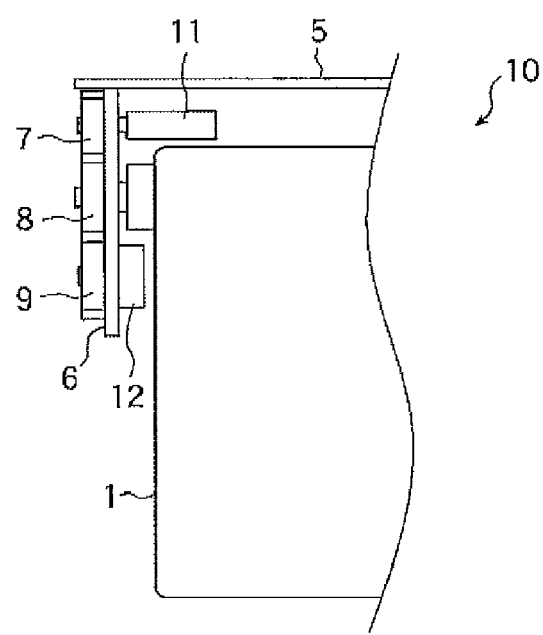
FIG. 4 is a side view of the display and the moving mechanism.

FIG. 2 shows an externally perspective view of an example of a display unit of an on-vehicle display device according to the present invention. In the display unit 10, the display 1 is coupled to a device body 5 via a pivot bracket 6. The display 1 has a rectangular shape whose one end portion is pivotally held to the pivot bracket 6 unified to the device body 5. A moving mechanism mainly of gear mechanics is incorporated into the pivot bracket 6. Now the moving mechanism for the display 1 will be explained with reference to FIG. 3 showing a front view of the pivot bracket 6 and FIG. 4 showing its side view as well.

On the pivot bracket 6, a drive gear 7, a transmission gear 8 and a sensor gear 9 are each shaft-mounted in this order beginning at the top. The drive gear 7 is engaged with the transmission gear 8 and the rotating shaft of a motor 11 is coupled to the shaft of the drive gear 7. The transmission gear 8 is engaged with the sensor gear 9 and one end portion of the display 1 is fixed to the shaft of the transmission gear 8. To the shaft of the sensor gear 9 is coupled a display-angle sensor 12 that detects the angle of the display 1. By the rotation of the drive gear 7 due to driving of the motor 11, the transmission gear 8 is made rotated to pivotally move the display 1, and also to rotate therewith the sensor gear 9 thereby detecting the angle of the display 1.

Figure 5:
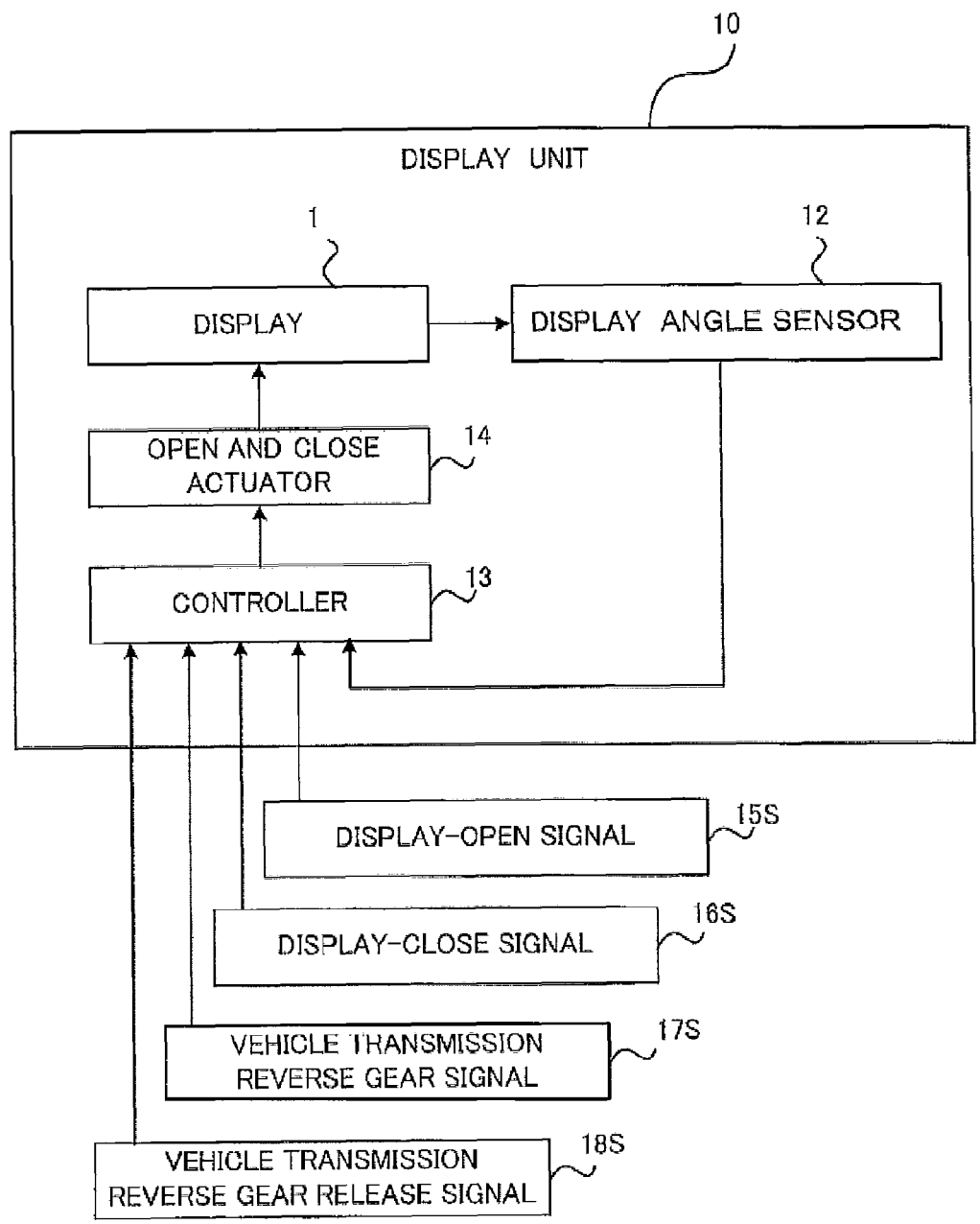
FIG. 5 is a block diagram showing a signal system of the display unit.

FIG. 5 shows as a block diagram an electrical system of the display unit 10. In FIG. 5, signal inputs from outside of the display unit 10 cause an open and close movement of the display 1. The status of the display 1 during the displacement will be explained referring accordingly to FIGS. 6 through 9.

In a general operation, when a display-open signal 15S is externally input to the display unit 10, a controller 13, as a control means, will transmit an open-instruction signal to an open and close actuator 14. The display-open signal 15S is transmitted by using, for example, a remote control switch operated by the user on the seat 2 or the like. The open and close actuator 14 includes the motor 11 for driving the drive gear 7, the transmission gear 8 and the sensor gear 9.

Figure 6:
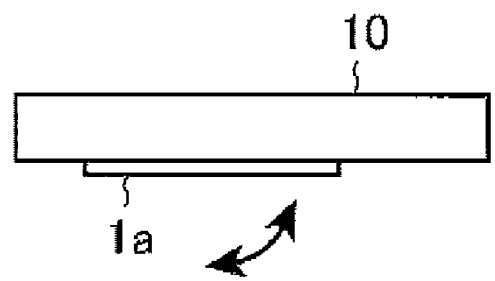
FIG. 6 is a front view of the display at its home position.

The display 1 is located at its home position 1a (FIG. 1 and FIG. 6). By the operation of the open and close actuator 14 having received the open-instruction signal, the display 1 at the home position performs an opening movement (FIG. 1 and FIG. 6). When the controller 13 determines, on the basis of the output from the display angle sensor 12, that the display is made open to a given view-angle position that is predetermined to be suitable for the user view, then the controller transmits to the open and close actuator 14 an opening operation stopping signal, to stop the opening movement whereby the display 1 is held at the destination angle. Accordingly, the display 1 is held at the best view-angle position, providing such a condition that the user on the seat 2 can see the display image.

During the actuator 14 being held at the best view-angle position (FIG. 1 and FIG. 7), when a display-close signal 16S is externally input to the display unit 10, the controller 13 will transmit a closing-instruction signal to the open and close actuator 14. The open and close actuator 14 having received the closing-instruction signal performs a closing operation for the display 1 by driving the motor 11.

When the controller 13 determines, on the basis of the output from the display angle sensor 12, that the display 1 reaches the home position (a storage state) at a given angle, then the controller causes the open and close actuator 14, according to the determination, to stop the closing operation. Thus, the display 1 returns to the home position 1a (FIG. 1 and FIG. 6).

The foregoing is a typical embodiment for use of the display 1.

Next, the movement of the display 1, during the backward driving of a vehicle under such a condition that the user is viewing the display 1, will be explained. The transmission of this vehicle includes a reverse-detection sensor (not shown) that outputs a signal when the transmission gear is shifted into the reverse position. The output of the reverse-detection sensor is input to the controller 13 of the display unit 10 as a vehicle transmission reverse signal 17S.

Figure 7:
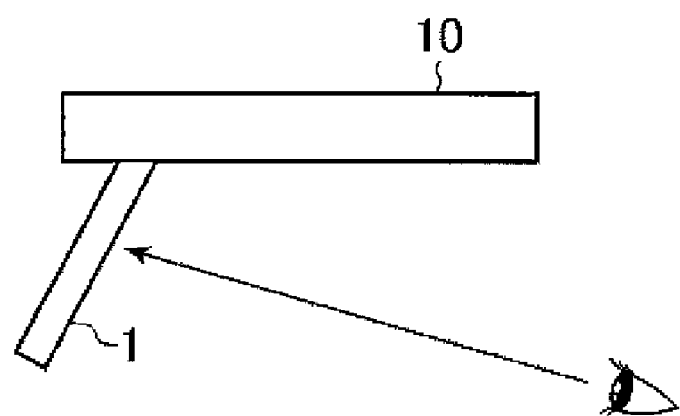
FIG. 7 is a front view of the display at a best view-angle position.
Figure 8:
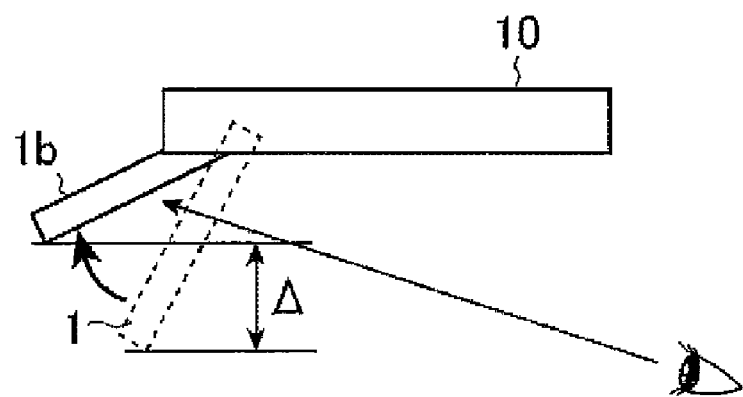
FIG. 8 is a front view showing displacement of a display from the best view-angle position to a view-angle position suitable for the backward driving.

While the user on the seat 2 is viewing the display 1 at a best view-angle position as shown in FIG. 1 and FIG. 7, when the driver shifts the transmission gear into the reverse position for backward driving of the vehicle, the vehicle transmission reverse signal 17S from the reverse-detection sensor is output to the controller 13. The controller 13 having received the vehicle transmission reverse signal 17S transmits an open-instruction signal to the open and close actuator 14. Then, the display 1 performs an opening movement in even more widely open direction than the present best view-angle position.

When the controller 13 determines, on the basis of the output from the display angle sensor 12, that the display 1 is made open to a predetermined angle, then the controller instructs the open and close actuator 14 to stop the opening operation, so as to hold the display 1 at a displaced-angle position of a predetermined destination angle. The predetermined angle is a minimum angle that avoids the interference by the display 1 to thereby allow the driver to secure the rearward view, and the angle can be registered individually for drivers in accordance with their height or the like.

The display 1 at the displaced-angle position 1b is in an open condition that is not in the closing direction but in the opening direction, and therefore the user having viewed on the seat 2, or the rear seat, is able to enjoy images on the display screen although not at the best position. This point is different from the manner as in a conventional art displacing it to the home position. The amount of displacement will be less than that in a conventional art and therefore the time required therefor is shortened accordingly.

After completion of the operation for the backward driving of the vehicle, the driver releases the transmission gear from the reverse position so as to permit the vehicle to move forward. Upon the release, outputting from the reverse-detection sensor is turned off. Simultaneously, the reverse-detection sensor outputs a vehicle transmission reverse gear release signal 18S to the controller 13 in the display unit 10. Alternatively, the vehicle transmission reverse gear release signal 18S may be provided on the basis of the signal transition to OFF-state from ON-state of the vehicle transmission reverse gear signal 17S. When the vehicle transmission reverse gear release signal 18S is input to the controller 13, it transmits a closing-instruction signal to the open and close actuator 14 whereby the display 1 performs a closing movement.

Figure 9:
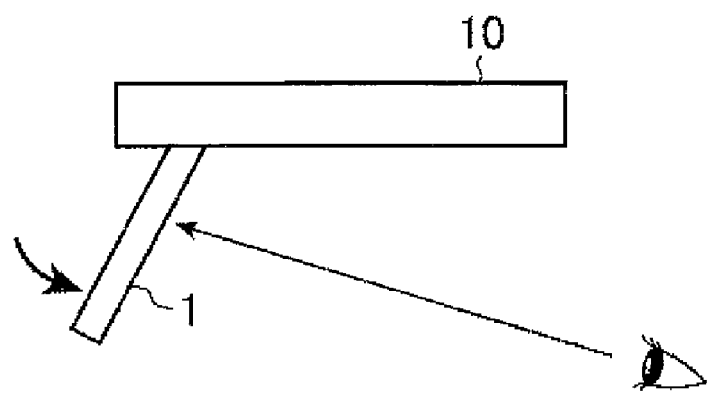
FIG. 9 is a front view showing displacement of the display from the view-angle position suitable for the backward driving to the best view-angle position.

When the controller 13 determines, on the basis of the output of the display angle sensor 12, that the display 1 is displaced by a predetermined angle, then the controller 13 instructs the open and close actuator 14, according to the determination, to stop the closing operation. The display 1 is thus moved to return to the view-angle position that is best for viewing. The condition after the return movement is shown in FIG. 9.

Although in the embodiment described above, an opening and closing movement of the display 1 is performed by externally inputting the reverse signal and the reverse release signal for the transmission gear, a backward driving signal and a forward driving signal for vehicle navigation that are internal signals in car navigation systems, may be utilized as the external input signals. By inputting these signals in the display unit 10, the display 1 can similarly performs an opening and closing movement. Or, an opening and closing movement of the display 1 may be performed by operating a switch on a device which can transmit similar signals and has been located at driver's hand.

As aforementioned, the driver can confirm the backward condition and the user on the rear seat can enjoy images on the display screen even during the backward driving of the vehicle. In addition, the swing range of the display 1 is small which enables a prompt displacement thereof.

The invention claimed is:

1. An on-vehicle display device which comprises a display open and close mechanism including a controller that electrically performs an open and close control of a ceiling-mounted display in a vehicle, wherein
    said display is positioned at a closed position when not in use,
    said controller controls the display to move in a direction away from the closed position to a view-angle position when the display is to be used, the view-angle position being at a first angle from the closed position,
    said controller controls the display, when it is opened at the view-angle position, to move further in the direction away from the closed position to a predetermined second angle from the closed position, which is greater than the first angle, upon detection of entering a backward driving state of the vehicle.

2. The on-vehicle display device of claim 1, in which said entering said backward driving state of the vehicle is detected by its transmission gear being shifted into a reverse position.

3. The on-vehicle display device of claim 1, in which said controller detects, while said display is positioned at said predetermined second angle, that the backward driving state of the vehicle is terminated, and then controls said display to return to said view-angle position.

4. The on-vehicle display device of claim 3, in which said termination of the backward driving state of the vehicle is detected by its transmission gear being released from the reverse position.

5. The on-vehicle display device of claim 2, in which said controller detects, while said display is positioned at said predetermined second angle, that the backward driving state of the vehicle is terminated, and then controls said display to return to said view-angle position.

6. The on-vehicle display device of claim 1, wherein the display is configured so that, when the display is positioned at the second predetermined angle, the driver's rearward field of view is wider than when the display is positioned at the view-angle position.

\* \* \* \* \*